United States Patent [19]

Parayil

[11] Patent Number: 5,529,644
[45] Date of Patent: Jun. 25, 1996

[54] STAINLESS STEEL AND CARBON STEEL COMPOSITE AND METHOD OF PRODUCING THE SAME

[75] Inventor: Thomas R. Parayil, New Kensington, Pa.

[73] Assignee: Allegheny Ludlum Corporation, Pittsburgh, Pa.

[21] Appl. No.: 453,929

[22] Filed: May 30, 1995

Related U.S. Application Data

[60] Continuation of Ser. No. 139,966, Oct. 20, 1993, abandoned, which is a division of Ser. No. 40,791, Mar. 31, 1993, Pat. No. 5,370,946.

[51] Int. Cl.$^6$ ...................................................... C21D 8/02
[52] U.S. Cl. ........................... 148/529; 148/534; 148/601
[58] Field of Search .................................. 148/529, 534, 148/557, 601, 602, 604; 29/17.3

[56] References Cited

U.S. PATENT DOCUMENTS

| | | | |
|---|---|---|---|
| 3,795,971 | 3/1974 | Chivinsky | 148/534 |
| 4,455,352 | 6/1984 | Ayres et al. | 148/529 |
| 4,956,025 | 9/1990 | Koyama et al. | 148/534 |

*Primary Examiner*—George Wyszomierski
*Attorney, Agent, or Firm*—Patrick J. Viccaro

[57] ABSTRACT

A pressure-bonded composite material includes at least one layer of a stabilized low carbon steel core material and one layer of a stainless steel joined at an interface, wherein the stabilized carbon steel includes columbium (niobium) and at least one other carbide-forming element in amounts effective to prevent carbon migration from the carbon steel to the stainless steel and the composite material has a physical grain size no larger than ASTM #6.

2 Claims, 3 Drawing Sheets

STAINLESS STEEL AND CARBON STEEL COMPOSITE AND METHOD OF PRODUCING THE SAME

This is a continuation of application Ser. No. 08/139,966, filed Oct. 20, 1993, now abandoned, which is a divisional of application Ser. No. 08/040,791, filed Mar. 31, 1993, now U.S. Pat. No. 5,370,946.

BACKGROUND OF THE INVENTION

1. Field of the Invention

The present invention relates to both a composite material and a method for producing the composite material. More particularly, the invention relates to both a pressure-bonded stainless steel and carbon steel composite material, and a method for producing the composite material.

2. Description of the Invention Background

Pressure-bonded composites of individual layers of steel are used in a variety of applications. As noted in U.S. Pat. No. 3,693,242, incorporated herein by reference, a composite comprising a core layer of plain carbon steel containing a carbide former and outer layers of stainless steel is used in producing certain metal items such as, for example, cookware. Related U.S. Patents include U.S. Pat. Nos. 3,795,971, 3,862,484, 3,944,396 and 3,956,809, which patents are hereby incorporated by reference. The stainless steel surface layers of the composite are corrosion-resistant and provide an attractive appearance, while the plain carbon steel core layer has relatively greater heat conducting properties than the stainless steel layers. A specific example of this type of composite material is A.I.S.I. Type 304DA ("T-304DA") which has a conventional low carbon steel core material and surface layers of A.I.S.I. Type 304 stainless steel ("T-304"). In hot processing conventional T-304DA, the standard practice is to cool the hot-rolled band to below 900° F. on the hot run out table before coiling. Failure to so cool the hot-rolled band to below 900° F. (482° C.) causes carbon from the low carbon steel core material to migrate into the interface region between the stainless steel surface layers and the low carbon steel core. This carbon migration occurs against the carbon concentration gradient and is dependent primarily on the attainment of an overall lower free energy. Such a migration against the concentration gradient frequently occurs from plain carbon steel to stainless steel because the stainless steel contains chromium which attracts the carbon.

Once migrated to the interface region, the carbon forms carbides, and thereby results in carbide enriched regions near the interface region. These carbide enriched regions cause so-called "Hook Cracks" upon drawing, an undesirable defect in the final product. In addition, carbon migration leads to the formation of a coarse ferrite grain layer in the low carbon core material which causes the defect known as "Orange Peel Surface" in the final product. Also, failure to cool below 900° F. may result in metal separation, whereby one or more stainless steel layers delaminate from the low carbon steel core layer.

In preventing these problems by cooling the hot-rolled band to below 900° F., other problems arise. Rapid cooling to below 900° F. on the hot run out table is disadvantageous because coiling the hot-rolled band after rapid cooling on the hot run out table, by, for example, water quenching, results in mechanical defects on the coil surface. These defects must be removed by surface grinding, necessitating additional production cost. Higher coiling temperatures would result in fewer mechanical defects.

One approach to the aforementioned problems is to cool hot-rolled bands of stainless steel/carbon steel composite material so that the coiling temperature is greater than 900° F., but less than 1200° F. (649° C.). This practice would minimize the propensity for both carbide formation in the interface region and the formation of coarse ferrite grains in the core material, while minimizing the prevalence of the mechanical defects on the coil surface which are associated with rapid cooling. Above about 1200° F., the defects associated with carbide formation could no longer be tolerated. However, because this approach is a compromise, it does not provide an entirely satisfactory solution; the aforementioned enriched carbide regions and coarse ferrite grains still form to some extent.

An article entitled "Development of New Low Carbon Low Alloy Steel Suited to be Clad with Stainless Steel" by Hashimoto et al., ISIJ, Vol. 31 (1991), pp. 706–711 discloses stabilized steels having less than 0.01% carbon and containing columbium (niobium) and titanium. The ferrite grain size is controlled by controlling the final anneal temperature and using faster cooling rates.

In addition to the above disadvantages experienced with the hot rolling of stainless steel/carbon steel composite materials, drawbacks are also experienced during processing. Stainless steel/carbon steel composite materials may require annealing at temperatures greater than 1700° F. (927° C.) in order to release stresses built up during the bonding process and any subsequent cold forming, and to dissolve chromium carbides formed in the stainless steel layers. Typical carbon steels, such as type 1006, used as composite core material, transform to a predominantly austenitic structure at temperatures below 1700° F., temperatures below the recrystallization temperature of typical stainless steels. Therefore, annealing at temperatures significantly greater than 1700° F. may cause significant coarsening of the austenite grains in the core layer, which transform into equally coarse ferrite grains upon cooling.

Accordingly, it is an object of the present invention to provide a carbon steel/stainless steel pressure-bonded composite material which may be coiled without purposeful cooling at a coiling temperature greater than 1200° F. with a reduced propensity for the formation of both (i) carbide enriched areas in the interface region and (ii) coarse ferrite grain layers in the carbon steel core material.

It is an additional object of the present invention to provide a carbon steel/stainless steel pressure-bonded composite material which has a substantially reduced incidence of mechanical defects after cooling at coiling temperatures greater than 1200° F., preferably greater than 1400° F. to about 1450° F. (760°–788° C.), as compared with T-304DA having conventional carbon steel core material.

It is also an object of the invention to provide a T-304DA composite material which may be processed using high anneal temperatures, preferably about 1850° F. up to about 1950° F., during the hot band anneal procedure without a significant amount of grain coarsening in the austenitic phase.

It is also an object of the invention to provide a stainless steel/carbon steel composite, such as T-304DA composite material, which satisfies the above objectives and which has mechanical properties comparable to those composites having conventional carbon steel core material.

In addition, it is an object of the invention to eliminate temper rolling as a final processing step.

SUMMARY OF THE INVENTION

The instant invention provides a pressure-bonded composite material which includes at least one layer of stainless steel bonded to at least one layer of a stabilized carbon steel along a stainless steel/carbon steel interface. The stabilized carbon steel of the composite includes carbon, columbium (niobium), and at least one other carbide-forming element in amounts effective to prevent carbon migration from the stabilized carbon steel to the stainless steel/carbon steel interface region. Accordingly, the interface region of the instant composite in its finished form is substantially free from enriched carbide regions. In addition, the ferrite grain size of the finished composite is no larger than ASTM #6 (higher numbers representing finer grains).

DETAILED DESCRIPTION OF THE INVENTION

Figure 1:
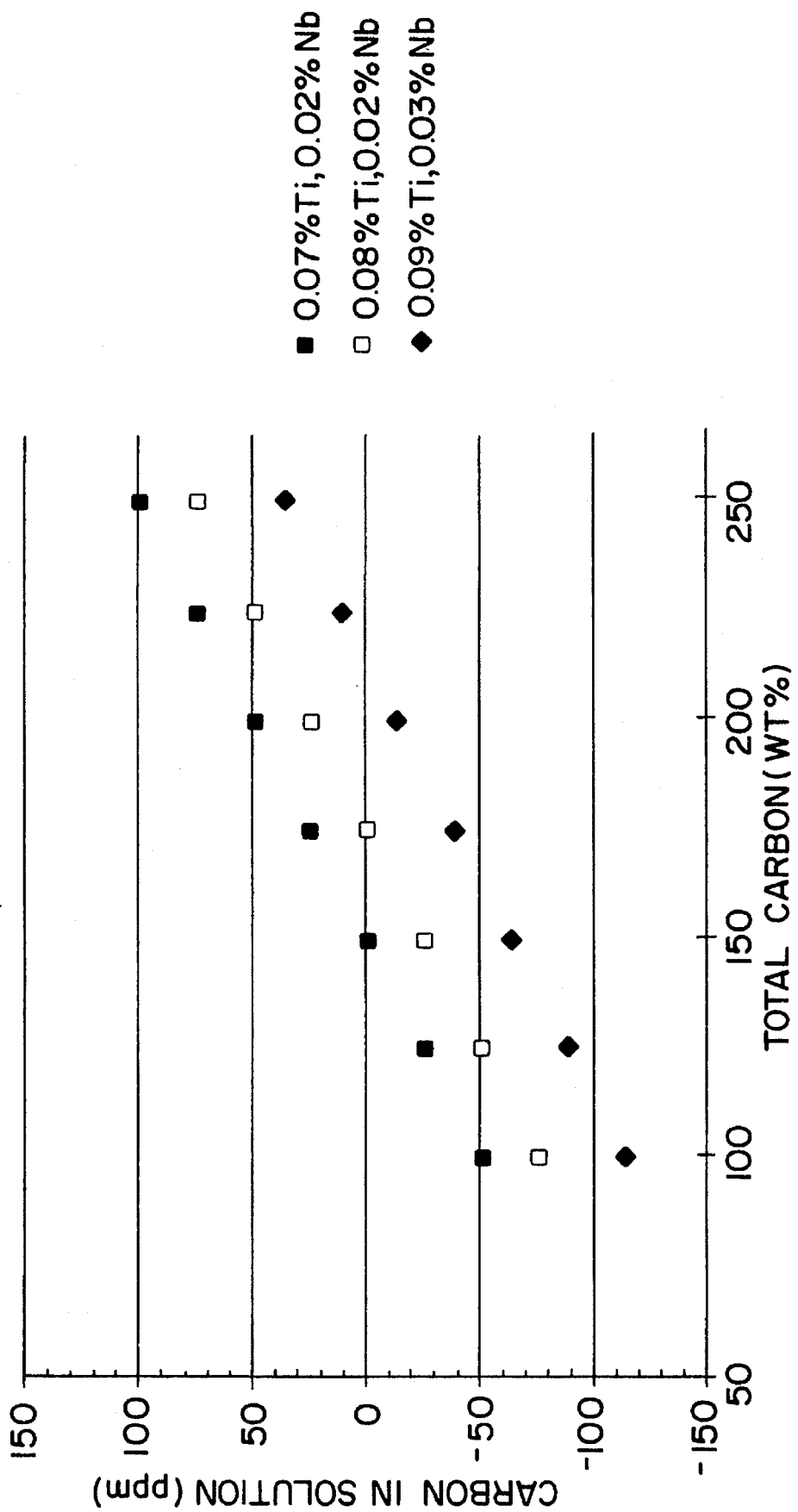
FIG. 1 is a graphical depiction of the proportion of carbon in solid solution in a steel alloy as a function of the carbon, titanium, and columbium content of the alloy.

As discussed above, one approach to the above-described problems experienced with the production of hot rolled stainless steel/carbon steel composite materials has been to cool the hot rolled composite to a temperature greater than 900° F., but less than 1200° F. before coiling. However, as noted above, this approach is not entirely satisfactory. The present invention applies a more comprehensive solution; the core material for the stainless steel/carbon steel composite of the present invention is a stabilized low carbon steel. The new stabilized core material described herein has been pressure-bonded to surface layers of T-304 stainless steel to form a T-304DA composite. It is contemplated, however, that comparable advantages will be experienced by pressure-bonding the stabilized core material of the present invention with one or more layers of other types of stainless steel.

"Stabilized" carbon steel has a chemistry which includes elements that bind, i.e., "scavenge", carbon and nitrogen atoms which would otherwise form undesirable precipitates in the steel. The scavenger elements form stable carbides and nitrides and thereby remove the carbon and nitrogen from solid solution. As such, scavenger elements may be referred to herein as "carbide-forming" elements. Because the presence of solute carbon in the steel during recrystallization contributes to the problems discussed above, it is desirable to stabilize carbon by creating its carbide form. A carbon steel is "fully stabilized" when the entire content of the carbon and nitrogen in the steel exists in the form of carbides and nitrides.

The use of the stabilized carbon steel of the present invention as the core material in a pressure-bonded stainless steel/carbon steel composite has been found to allow a coiling temperature significantly greater than 1200° F., for example, 1400° F. to 1450° F., while significantly reducing the propensity, compared with T-304DA having conventional carbon steel core material, for the above-mentioned problems of carbide precipitation and coarse ferrite grain layer formation. As such, a hot-rolled composite material including the herein-described stabilized core material need not be cooled on the hot run out table before coiling. In addition, the carbon steel/stainless steel pressure-bonded composite material of the present invention has a substantially reduced incidence of mechanical defects, compared with conventional T-304DA, when coiled at the above-mentioned elevated temperatures. Also, a T-304DA composite material formed using the stabilized core material described herein may be processed using high anneal temperatures, from about 1850° F. up to about 1950° F., during the hot band anneal procedure without significant grain coarsening in the austenitic phase. Finally, the T-304DA composite material having the herein-disclosed stabilized core material has mechanical properties comparable to those of T-304DA with a conventional carbon steel core material.

In formulating the chemistry of the stabilized core material of the present invention it is believed that a composite material satisfying the above objectives must have a carbon steel core material which maintains a relatively small ferrite grain size after extensive processing at high temperatures (greater than about 1950° F.). As such, it is believed that the ferrite grain size existing before processing must be either smaller or equal to the ferrite grain size desired after processing. Therefore, it is believed that a physical grain size equal to or smaller than the ASTM #6 grain size of the final annealed ferrite should exist at every stage of processing. In order to control the instant core material's pre- and post-processing grain size, the instant invention utilizes two methods: (1) the distribution of carbide precipitates within the alloy and (2) the limiting of grain size boundaries by solute pinning.

The first method utilized to control grain size in the core material of the pressure-bonded composites of the present invention is to distribute within the alloy precipitates which have a size, distribution, and volume fraction compatible with the desired post-processing grain size. The precipitate distribution must be stable at the high temperatures employed during high temperature annealing and must also inhibit coarsening of the austenite grains at these high temperatures.

Precipitates may be produced in steels by the addition of the above-mentioned carbide-forming "scavenger elements", which have a strong affinity for carbon and form carbides when present in carbon steel. Such scavenger elements include, for example, titanium, columbium, zirconium, vanadium, tantalum, chromium, molybdenum, tungsten, uranium, boron, and cobalt. The present invention employs columbium and at least one other scavenger element which is a relatively strong carbide former. More importantly, the scavenger element or elements added in addition to columbium must form precipitates which are stable at high temperatures. Preferably, the addition of titanium and columbium in the present carbon steel core material produces carbides of titanium and columbium, compounds which have a greatly reduced solubility in steel solid solution up to about 2050° F. (1121° C.) or more.

Ultimately, the amount of precipitates formed depends upon the carbon content of the alloy's core material. Therefore, in order to achieve a certain grain size it is necessary to choose an appropriate carbon content for the steel. It is believed that about 0.01% to about 0.025% by weight carbon, preferably about 0.01% to about 0.02% by weight carbon, with an appropriate amount of titanium, will yield an amount of titanium carbide precipitates sufficient to provide a ferrite grain size for the core material of the composite at least as fine as ASTM #6 (high numbers representing finer grain sizes) at all stages of processing. The titanium content is to be adjusted according to the formula discussed hereinbelow.

In order to achieve the appropriate distribution of the carbide precipitates in the alloy it is necessary to dissolve the precipitates in the reheat furnace and re-precipitate them during the hot rolling procedure. Titanium carbides and columbium carbides are amenable to this type of dissolution and re-precipitation because they may be dissolved in the reheat furnace at temperatures of 2250° F. (1232° C.). However, unless the nitrides of titanium and columbium are dissolved at much higher reheat temperatures they will form coarse precipitates which reduce the effectiveness of the titanium and columbium to refine grain size. Therefore, the nitrogen content of the steel should be limited to no more than 0.008% by weight, preferably no more than 0.005% by weight.

As noted above, a second method relied on in the present invention for limiting grain size is "solute pinning", wherein the growth in size of individual ferrite grains is hindered during the transformation from the austenire to the ferrite structure. Columbium may be used to provide solute pinning, and indeed, columbium was added to the experimental melts primarily to accomplish solute pinning. It is believed that in order to appropriately impede grain growth during recrystallization, columbium should be added to the experimental melts in an amount between about 0.02% and 0.04% by weight, preferably 0.03% by weight.

Based upon the above-described carbon, nitrogen and columbium contents, the titanium content of the carbon core material should be adjusted consistent with Equation 1 below, which has been plotted in one form in FIG. 1. Percentages are weight percentages.

$$\% \text{ titanium} = (24/7 \times \% \text{ nitrogen}) + 24/6 (\% \text{ carbon} - (\% \text{ columbium} \times 4/31))$$
Equation 1

FIG. 1 depicts the proportion of carbon in solid solution as a function of the carbon, titanium, and columbium content of a steel alloy. Negative numbers for carbon in solution indicate overstabilization, i.e., the state wherein there is an excess of carbide-forming scavenger elements. Positive numbers indicate understabilization of the carbon in solution. It is apparent that opposing concerns are implicated in deciding what level of carbon stabilization is desired. When a relatively large amount of precipitates are formed through stabilization, a higher reheat temperature is required to dissolve the precipitates before re-precipitating them out of the hot band. However, too little stabilization may allow carbon in solution to migrate to the interface region and form undesirable carbide enriched regions. To balance these opposed concerns, the stabilized carbon steel of the present invention has a melt chemistry such that it is overstabilized in a certain portion of composition range and understabilized in a different portion of the composition range. Based upon the information provided in FIG. 1, it is believed that a titanium content of about 0.07% to about 0.09% by weight will fully stabilize the steel at low carbon levels and partially stabilize the steel at high carbon levels.

Based on the above considerations, two experimental melts of a stabilized carbon steel core material were prepared having the chemistries shown in Table 1. All percentages are shown in weight percent of the total alloy weight.

TABLE 1

| Chemistries of Experimental Heats in Weight Percent of Total Alloy Weight | | |
| --- | --- | --- |
|  | Heat A | Heat B |
| Carbon | 0.011 | 0.019 |
| Nitrogen | 0.003 | 0.003 |
| Titanium | 0.064 | 0.079 |
| Columbium | 0.023 | 0.025 |

It is to be understood that other elements may be included in the alloy compositions in addition to those in Table 1. These additional elements may be present either as incidental impurities or as elements purposely added for some auxiliary purpose such as, for example, to impart some desired property to the finished core material or composite. The alloy may contain, for example, residual levels of manganese, sulfur, phosphorous and aluminum. Accordingly, the examples described herein should not be interpreted as unduly limiting the claims. In addition, the experimental melts of Table 1 are intended to be representative of the desired and preferred ranges for the elements included in the experimental alloys. It is believed that comparable properties will be achieved by selecting different formulations for the melts within the desired or preferred ranges.

The stabilized carbon steel alloy of each experimental heat was used to prepare assemblies of T-304DA pressure-bonded composite material, each assembly including a layer of the experimental stabilized low carbon steel bonded to surface layers of conventional T-304 stainless alloy. The various methods for producing the assemblies and bonding the layers of the assemblies into T-304DA composite material are known to those skilled in the art. Representative examples of those methods are described in the above-mentioned U.S. Pat. Nos. 3,693,242 and 3,862,484.

Using methods known to those in the art, four T-304DA assemblies were prepared using core material from each experimental heat, eight assemblies in total. In producing each T-304DA composite, the completed assemblies were hot rolled to an intermediate gage of 0.125 inch (3.17 mm) and coiled at various coiling temperatures. Samples were collected from all eight of the coils in the as-hot-rolled state to determine the grain size therein.

Two hot rolled assemblies having core material from experimental Heat A and two hot rolled assemblies having core material from experimental Heat B were coiled without intentional cooling at a coiling temperature greater than 1400° F. up to 1550° F. (843° C.) and ranging from 1420°–1500° F. (771°–816° C.). The remaining four assemblies were quickly cooled by water quenching on the hot run out table and then coiled at temperatures in the range of 1000° F. to 1200° F. The experimental coils were observed to have a better shape than coils of T-304DA having conventional core material. "Better shape" was a subjective determination made after observing that strip grinding of the coils was reduced significantly.

All four of the coils which included core material from experimental heat A were hot band annealed for 110 seconds to reach a strip temperature at or above 1850° F. to a maximum temperature of 1940° F. The cooling rate was between 60° to 90° F./second (333° F. to 50° C./second). Likewise, two coils having core material from Heat B, one coil which was water-quenched and one coil which was not intentionally cooled before coiling, were hot band annealed using the same procedure. Experimentation indicates that the ferrite grain size in the core of the annealed coils was between ASTM #7.0 and #8.0.

After hot band annealing, the six experimental coils were then cold rolled to a final 0.037 inch (0.94 mm) gage. All of the experimental coils were then annealed and pickled. After final annealing, portions of each of the six experimental coils were tested as-annealed and after a temper roll ("skin pass"). Temper rolling is a conventional procedure normally used with conventional low carbon cores to eliminate stretcher strain in the finished composites. The mechanical properties and observed microstructure, respectively, of the final experimental stabilized core T-304DA materials are shown in Tables 2 and 3. For comparison purposes, Tables 2 and 3 also include the average expected properties for T-304DA composite material having a conventional (i.e., unstabilized) low carbon steel core. Table 2 also indicates which final procedure was used to process the coil samples, either a final anneal procedure or the "skin pass" procedure prior to the test. As used here, the term "skin pass" means a final anneal followed by a temper rolling.

The 15T hardness provided in table 2 was calculated by ASTM E-18. That testing procedure is conducted using a 1.588 mm (1/16") diameter ball with the preliminary test force or clamping force being 3 kg/foot ("kgf") (29N), an additional force of 12 kgf (119N), and thus, a total force of 15 kgf (147N). The hardness is expressed as the difference of 100 and the permanent increase in depth of penetration under the preliminary force when the additional force is removed. The increase is measured in units of 0.001 mm.

carbon level lower than Heat B. As indicated in Table 2, the mechanical properties of the experimental composites are comparable to those of T-304DA which includes conventional (i.e., unstabilized) low carbon steel core material. The results of Table 2 indicate R-bar values for the experimental material in the range of 1.1 to 1.2 and an LDR value of 2.06. In addition to favorable mechanical properties, the results of Table 2 show that the unique chemistry of the experimental composites eliminates the need for temper rolling (i.e., skin pass) of the final product.

As used here, the R-bar value is a plastic strain ratio which is a measure of the anisotropy of the material when deformed. The R-bar value is a calculated average of tensile strains of difference directions. The "LDR" value is a Limited Drawing Ratio determined from the ratio of a maximum diameter blank that can be drawn to a standard diameter. The LDR value indicates the drawability of the finished composite.

Table 3 below provides grain size data for the finished experimental composites measured at various positions through the composite structure: the grain size of Clad A is measured at one surface layer of T-304 stainless steel; that of Clad B is measured at the interface region between one layer of T-304 surface and the stabilized core material; Clad C is measured in the mid-core region; and Clad D is measured at the other T-304 surface layer. Table 3 also records the occurrence of any carbon migration from the

TABLE 2

MECHANICAL PROPERTIES OF EXPERIMENTAL STABILIZED CORE T-304DA

|  | Average Properties for | T-304DA with Core Material from Experimental Heat A | | | | T-304DA with Core Material from Experimental Heat B | | | |
| --- | --- | --- | --- | --- | --- | --- | --- | --- | --- |
|  | .037" Gage T-304DA with Conventional Core Material | No Water Quench | | Water Quench; Coiling Temperature <1200° F. | | No Water Quench | | Water Quench; Coiling Temperature <1200° F. | |
| Last Process | X | Y | X | Y | X | Y | X | Y | X |
| Yield strength | 44.0 | 41.5 | 49.3 | 40.8 | 48.1 | 46.1 | 52.8 | 45.0 | 51.4 |
| Tensile strength | 69.7 | 71.0 | 70.3 | 70.5 | 70.0 | 74.0 | 74.3 | 72.8 | 73.4 |
| Elongation | 48% | 50% | 46% | 51% | 48% | 47% | 43% | 46% | 44% |
| Hardness, 15T | 85.5 | 84.6 | 85.8 | 84.6 | 85.7 | 85.7 | 86.7 | 85.6 | 86.5 |

Last Process Y = Final Anneal
Last Process X = Skin Pass
Hardness, 15T determined using ASTM E-18.

The tensile properties shown in Table 2, i.e., yield strength, tensile strength, and elongation, did not change with different testing directions. However, the yield and tensile strength decreased significantly for the composites produced with the core material from Heat A, which had a core material into the core interface region. Grain sizes are shown as ASTM numbers. By way of example, the phrase "8S9" means ASTM grain size 8 with scattered grains of ASTM grain size 9. The phrase "9-8" means primarily ASTM grain size 9, but including many size 8 grains.

TABLE 3

GRAIN SIZE OBSERVED FOR EXPERIMENTAL STABILIZED CORE T-304DA (ASTM NOS.)

| | Average Properties for .037" Gage T-304DA with Conventional Low Carbon Steel Core Material | T-304DA with Core Material from Experimental Heat A | | T-304DA with Core Material from Experimental Heat B | |
|---|---|---|---|---|---|
| | | No Water Quench | Water Quench; Coiling Temperature <1200° F. | No Water Quench | Water Quench; Coiling Temperature <1200° F. |
| Grain Size | | | | | |
| Clad A (T-304) | 8.1 | 8S9 | 8-8 | 9-8 | 9-8 |
| Clad B (Interface) | 7.0 | 7-7 | 7-7 | 7-7 | 7-7 |
| Clad C (Mid Core) | 7.7 | 6-7 | 6-7 | 7S6 | 7S6 |
| Clad D (T-304) | 8.1 | 8S9 | 8-8 | 9-8 | 9-8 |
| Migration | | NIL | NIL | NIL | NIL |

As shown in Table 3, grain sizes throughout the experimental composites were consistent with the invention's objectives. No coarse ferrite grain layers were observed to occur upon the processing of the experimental composites. Grain sizes at all points through the finished composite compare favorably with that of a T-304DA composite which includes conventional low carbon steel core material. All grain sizes were finer than the average of the conventional T-304DA composite except at the clad C (mid-core). Also, no carbon migration into the core interface region was observed in any of the experimental samples. Consequently, no carbide enriched regions were observed in the vicinity of the interface region within the experimental samples.

Several of the experimental coils were annealed to dissolve any carbide precipitates and allow them to re-precipitate. In order to determine satisfactory annealing temperatures and times, black band samples of the experimental T-304DA composites were cut to perform a hot band annealing study. Consistent with the objectives outlined above, the objectives of the annealing study were to (i) speed up the hot band anneal while preventing carbide formation in the stainless steel layers and (ii) maintain a fine ferrite grain size of at least ASTM #7 to #8 in the core material. The annealing study utilized temperatures in the range of 1850° F. to 2100° F. (1010° to 1149° C.). Samples were heated to the selected anneal temperature in approximately 122 seconds and held at the anneal temperature for 0 to about 70 seconds. After the anneal procedure, the annealed samples were then water cooled to a temperature below 700° F. (371° C.) in 30 seconds at a cooling rate of 38° to 65° F./second and evaluated for microstructure.

The annealing experiments showed that anneals at 1850° F. for 30 seconds, 1900° F. for 10 seconds, or 1950° F. for 0 seconds were sufficient to achieve the microstructural goals. These anneals ensured that the carbides in the stainless steel layers were taken into solution and that the grain size of the austenire in those layers was in the range of ASTM #8.5 to #10. Increasing the anneal temperature above 1950° F. tended to undesirably increase the amount of coarse austenite (which transformed to widmanstatten ferrite) in the core of the T-304DA samples. Also, using an anneal temperature in excess of 1950° F. caused the austenire grain size in the stainless steel layers to increase to ASTM #7 to #8 from the grain size ASTM #8.5 to #10 achieved at lower anneal temperatures.

Figure 2:
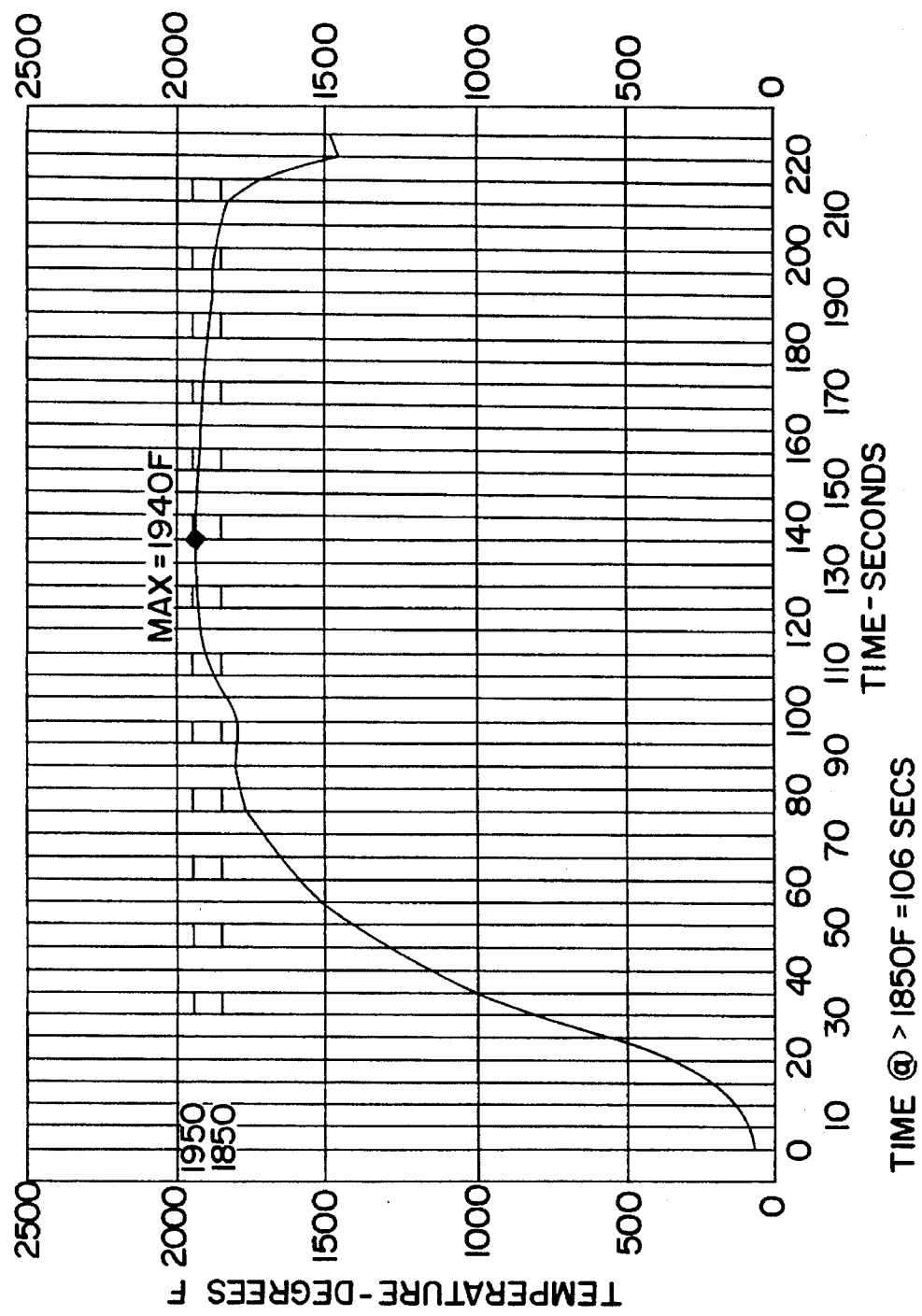
FIG. 2 is a time-temperature plot of a prior practice of hot roll band annealing.
Figure 3:
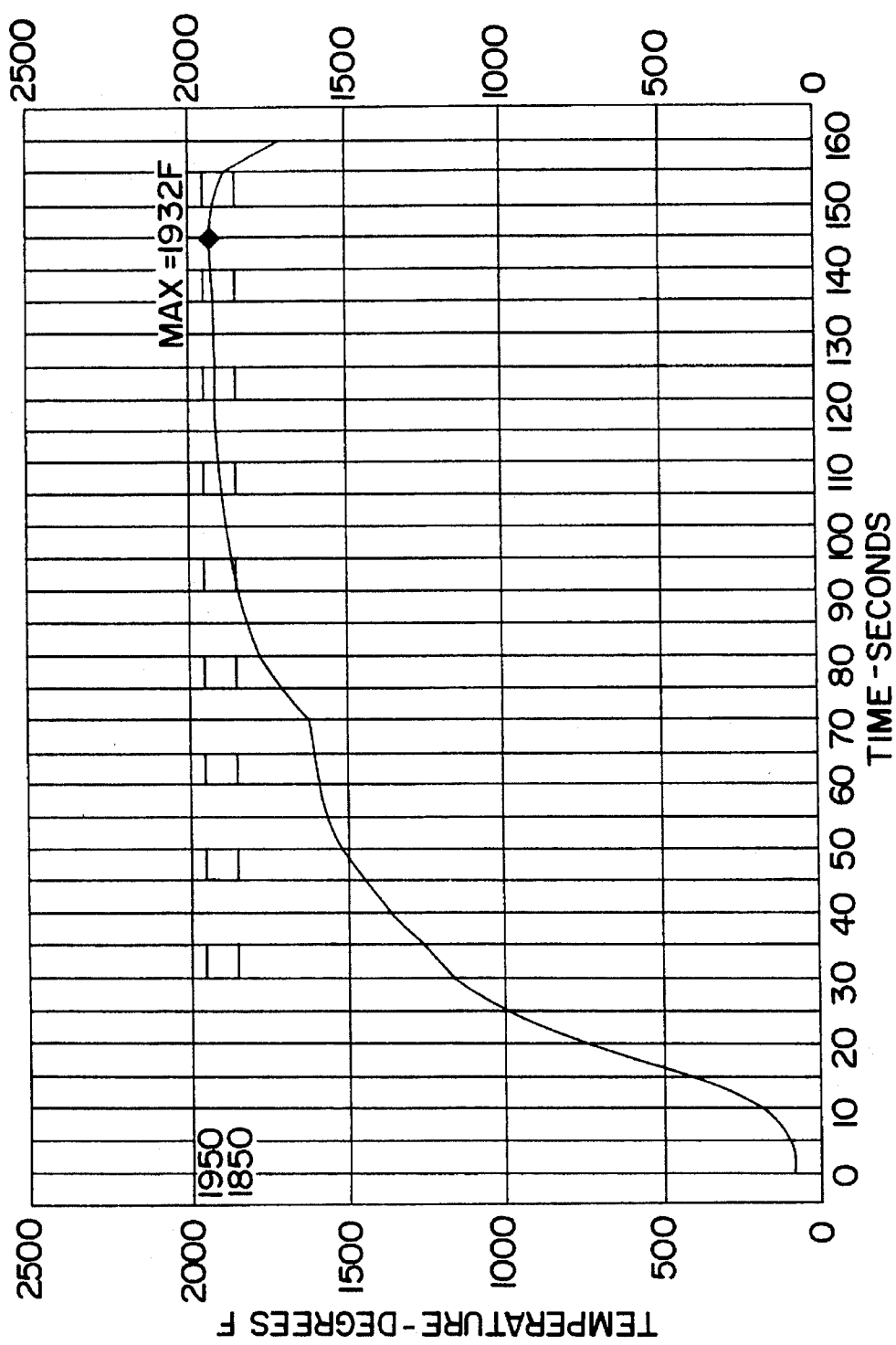
FIG. 3 is a time-temperature plot of a faster anneal cycle of the present invention.

In accordance with the present invention, the hot rolled anneal can be done in shorter time within the range of 1850° F. up to 1950° F. The annealing experiments demonstrated that a time-at-temperature of 30 seconds at 1850° F., and less time at higher temperatures, was sufficient to ensure that carbides in the stainless steel layers were taken into solution. As a result, the hot rolled band anneal line speeds can be increased significantly. Representative examples are illustrated in FIGS. 2 and 3. FIG. 2 is representative of a time-temperature plot of the prior practice of hot rolled band anneal. The prior practice hot band anneal uses 1950° F. zone temperatures with a strip speed of 28 feet per minute (fpm). The strip is at a temperature greater than 1850° F. for 110 seconds with a maximum temperature of 1940° F. The cooling rate is 45° to 65° F./second. FIG. 3 illustrates the faster anneal cycle of the present invention. The faster anneal cycle uses 2000° F. in the preheat zones and 1975° F. in the heating zones with a strip speed of 40 FPM. The strip is at a temperature greater than 1850° F. for 64 seconds with a maximum temperature of 1930° F. The cooling rate is 60° to 90° F./second.

Although the faster anneal cycle is preferably used with the stabilized carbon steel core of the present invention, it has been found to be useful even with conventional carbon steel/stainless steel composites.

As was the object of the present invention, a modified carbon steel/stainless steel composite is provided having a reduced propensity for the formation of carbide enriched areas in the interface and having finer grain size in the carbon steel core. The modified core chemistry permits the composite to be coiled at higher temperatures after hot rolling with a reduced incidence of mechanical defects. The composite also has the benefit of no requirement for skin pass rolling to eliminate the stretcher strains common in composites using conventional carbon steel core materials.

What is claimed:

1. A method for producing a pressure-bonded composite material comprising the steps of producing a hot-rolled band of a composite material, said composite material comprising at least one layer of stainless steel bonded to at least one layer of a stabilized carbon steel, coiling the hot-rolled band at a temperature greater than about 1400° F., then annealing the hot-rolled band at a temperature of between about 1850° F. and 1950° for a sufficient time up to 64 seconds to allow carbides in the stainless steel to go into solution, said stabilized carbon steel comprising the following elements by weight percent of the total weight of stabilized carbon steel:

about 0.01 to about 0.025% carbon;
about 0.07 to about 0.09% titanium;
about 0.02 to about 0.04% columbium;
no more than about 0.008% nitrogen; and
the balance iron, wherein the method minimizes carbide precipitation and grain coarsening in the carbon steel.

2. The method of claim 1 wherein the stabilized carbon steel comprises the following elements by weight percent of the total weight of stabilized carbon steel:

about 0.01 to about 0.02% carbon;
about 0.07 to about 0.09% titanium;
about 0.02 to about 0.04% columbium;
no more than about 0.005% nitrogen; and
the balance iron.

* * * * *